(12) United States Patent
Coughlin et al.

(10) Patent No.: US 10,586,237 B2
(45) Date of Patent: Mar. 10, 2020

(54) METHOD, APPARATUS, AND COMPUTER-READABLE MEDIA FOR CUSTOMER INTERACTION SEMANTIC ANNOTATION AND ANALYTICS

(71) Applicant: XSELL Technologies, Inc.

(72) Inventors: Matthew B. Coughlin, Tinley Park, IL (US); Mark Stoehr, Chicago, IL (US)

(73) Assignee: XSELL TECHNOLOGIES, INC., Chicago, IL (US)

( * ) Notice: Subject to any disclaimer, the term of this patent is extended or adjusted under 35 U.S.C. 154(b) by 220 days.

(21) Appl. No.: 15/710,170

(22) Filed: Sep. 20, 2017

(65) Prior Publication Data

US 2019/0087828 A1    Mar. 21, 2019

(51) Int. Cl.
*G06Q 30/00* (2012.01)
*G06Q 10/06* (2012.01)

(52) U.S. Cl.
CPC ....... *G06Q 30/01* (2013.01); *G06Q 10/06316* (2013.01); *G06Q 10/063114* (2013.01)

(58) Field of Classification Search
CPC .......... G06Q 30/01; G06Q 10/063114; G06Q 10/06316
See application file for complete search history.

(56) References Cited

U.S. PATENT DOCUMENTS

| | | | |
|---|---|---|---|
| 6,519,628 B1 | 2/2003 | Locascio | |
| 7,761,321 B2 | 7/2010 | Kannan et al. | |
| 7,996,251 B2 | 8/2011 | Kannan et al. | |
| 8,260,846 B2 | 9/2012 | Lahav | |
| 8,296,437 B2 | 10/2012 | Pankratov | |
| 8,396,741 B2 | 3/2013 | Kannan et al. | |
| 8,539,028 B2 | 9/2013 | Anka | |
| 8,565,411 B2 | 10/2013 | Kannan et al. | |

(Continued)

OTHER PUBLICATIONS

Search Report and Written Opinion dated Jun. 24, 2016 in connection with International Application No. PCT/US2016/025887 (12 pages).

(Continued)

*Primary Examiner* — Sujay Koneru
(74) *Attorney, Agent, or Firm* — McCracken & Gillen LLC (57) ABSTRACT

Computer-implemented method and apparatus for customer interaction management using interaction semantics to leverage knowledge across interaction media including web chat. An agent device displays to the agent (i) a plurality of instructions and directions about how to interact with the customer with real-time updates, (ii) a plurality of feedback to inform the agent in real-time of their current performance, and (iii) an annotation engine for providing semantic annotations of the interaction in real-time or offline so that stored interactions are annotated to better assist the development of machine learning systems that provide direction and feedback to agents. The present invention provides an interface for business users to set strategies to be used by agents during their interactions and to view the outcomes of particular strategies being implemented. The present invention provides an organic manner in which an organization can semantically annotate interaction data in a semi-automated process and also provide analytics about the use of particular interaction strategies at the semantic level.

9 Claims, 5 Drawing Sheets

(56) References Cited

U.S. PATENT DOCUMENTS

| | | |
|---|---|---|
| 8,566,135 B2 | 10/2013 | Kannan et al. |
| 8,661,049 B2 | 2/2014 | Will et al. |
| 8,737,599 B2 | 5/2014 | Kannan et al. |
| 8,738,732 B2 | 5/2014 | Karidi |
| 8,762,313 B2 | 6/2014 | Lahav et al. |
| 8,782,168 B2 | 7/2014 | Anka |
| 8,799,200 B2 | 8/2014 | Lahav |
| 8,805,844 B2 | 8/2014 | Schorzman et al. |
| 8,805,941 B2 | 8/2014 | Barak et al. |
| 8,862,684 B2 | 10/2014 | Tyukasz et al. |
| 8,868,448 B2 | 10/2014 | Freishtat et al. |
| 8,886,724 B2 | 11/2014 | Anka |
| 8,918,465 B2 | 12/2014 | Barak |
| 8,929,546 B2 | 1/2015 | Vukoszavlyev |
| 8,935,619 B2 | 1/2015 | Kannan et al. |
| 8,943,002 B2 | 1/2015 | Zelenko et al. |
| 8,954,539 B2 | 2/2015 | Lahav |
| 9,118,763 B1 * | 8/2015 | Margulies ............ H04M 3/5191 |
| 2003/0065524 A1 | 4/2003 | Giacchetti et al. |
| 2005/0108775 A1 * | 5/2005 | Bachar ................. G06Q 50/22 |
| | | 725/135 |
| 2006/0126818 A1 * | 6/2006 | Berger ................. H04M 3/5191 |
| | | 379/265.09 |
| 2009/0271205 A1 | 10/2009 | Finn et al. |
| 2010/0138282 A1 * | 6/2010 | Kannan ............ G06Q 10/06398 |
| | | 705/7.42 |
| 2010/0325216 A1 | 12/2010 | Singh et al. |
| 2014/0058894 A1 | 2/2014 | Honehacker |
| 2015/0071418 A1 * | 3/2015 | Shaffer ................. H04M 3/493 |
| | | 379/88.01 |
| 2015/0195406 A1 * | 7/2015 | Dwyer ................. H04M 3/5175 |
| | | 379/265.07 |
| 2016/0189558 A1 * | 6/2016 | McGann .................. G09B 5/06 |
| | | 434/219 |
| 2016/0219149 A1 | 7/2016 | Krishnan et al. |

OTHER PUBLICATIONS

Search Report and Written Opinion dated Jan. 24, 2019 in connection with International Application No. PCT/US2018/1851903 (12 pages).

* cited by examiner

METHOD, APPARATUS, AND COMPUTER-READABLE MEDIA FOR CUSTOMER INTERACTION SEMANTIC ANNOTATION AND ANALYTICS

TECHNICAL FIELD

The present invention relates to customer relation management (CRM) and more particularly is a computer-implemented method and apparatus for customer interaction management (CIM).

BACKGROUND OF THE INVENTION

An important need for any organization is managing and directing/managing the inbound and outbound interactions with customers, and often with real time requirements. Many organizations have multiple channels: customers can visit/search the organization website, make a call to a call center, chat through web chat, visit a branch office, communicate via email, or correspond through the postal service. In the course of these communications a customer also engage economically with the organization by paying for goods/services and/or receiving goods/services from the company. In order to sell more and market goods/services, considerable effort has been expended to direct customer interactions in order to better meet customer needs. Due to the multi-channel nature of customer interactions, many different individuals within the organization will often interact with each customer, and there is a significant need for coordinating, across these different channels, and across time within the same channel.

Moreover, each interaction is complex and it would be useful to define precisely the strategies that are employed by the organization so that experiments and statistical inference may be used to continuously improve interactions with customers. For example, in the area of web chat, certain strategies (including discussing particular stories, introducing well-matched groups of items to purchase, etc. based on customer profiles) can significantly increase sales and improve customer relationships. Organizations are dynamic and are continually releasing new products and services requiring new strategies to be developed and implemented. There may be significant costs in retraining company representatives to use these new strategies and to coordinate across different channels and different interaction sessions.

One increasingly popular approach is to provide employees with an interaction manager (IM) that is available through a computer system and connects through a network to a server which manages the interactions. "Agent work" may include work using a computer with real time network communications and an interactions server with an occasionally-connected augmented visible dashboard. Through connection to one or more servers, an agent communicates with a customer via chat, voice, email, web site, and/or post, for business development purposes. The IM is designed for gathering information associated with customer interactions that occur within interaction sessions, as well as other inbound/outbound communications and behaviors. The IM also provides an augmented computer display dashboard for enriching agent work with offers or recommendations based upon the comprehensive real-time view of customer information, augmented by business rules and/or data mining.

While a typical IM may provide real time offers and/or suggestions for agents using an augmented dashboard, it is not designed to manage the information-state of the customer or to adapt and personalize the interaction to each unique customer. Typical IM systems, for instance, do not perform adaptive natural language generation for agents nor do they provide continuous feedback to agents on the quality of their interaction with the customer. Furthermore, typical IM systems do not adaptively create new concepts to understand customer segments and goals.

Typical IM systems have only very limited knowledge about how customers make decisions Typical IM systems, for instance, do not perform adaptive natural language generation for agents nor do they provide continuous feedback to agents on the quality of their interaction with the customer. Furthermore, typical IM systems do not adaptively create new concepts to understand customer segments and goals.

Typical IM systems cannot achieve these aims because they lack semantically annotated data. Standard systems in the field of natural language understanding require a great deal of semantically annotated data in order to be effective. As customer interaction data is not annotated for customer goals, customer information state, or agent strategy it is difficult for an agent to get adaptive information in real time about the interaction.

SUMMARY OF THE INVENTION

The invention relates to consistently enhancing the customer interaction experience across all the channels through which a customer interacts with a company. It includes the methods, systems, and computer programs needed to enhance customer experiences by defining a set of adaptive strategies during customer interactions across the variety of customer interaction channels. It includes the methods, systems, and computer programs preferably used to: (1) share information across interaction sessions and across channels about customer information states, customer characteristics, and customer intentions, in order to choose and to adapt strategies; (2) report analytics about these systems and relate these events to sales outcomes; (3) design experiments to increase sales through alteration of customer interaction strategies.

The present invention overcomes the problems with the known art, at least in part, by providing an unconventional approach to organizing and structuring customer interaction data; namely the idea of customer interaction semantics (CIS). Instead of simply storing and indexing customer interaction data by the interaction types and measured values, the interaction data is semantically annotated so that segments of the data are associated with a "semantic space", allowing users of the system to incorporate "meaning-based" analytics and inference. Such a system will provide "meaning-based" search of interaction data, and be able to compare customer interaction data in the semantic space so that the invention captures "semantic similarity". To capture these relationships, the invention preferably provides a semantic annotation interface so that semantic annotation can be performed in an automatic or semi-automatic fashion, preferably combining manual agent work and automated inference. Through the semantic annotation system, the invention accumulates knowledge of customer interactions, connections between customer interactions, and meta-knowledge annotations which may include any of, but is not limited to, knowledge utility, knowledge confidence/certainty level, agent reputations, additional descriptive content, and commentary.

The present invention, therefore, provides the IM system with a semantics engine in order to better manage customer interactions. In preferred embodiments, the IM system is available through a network (e.g., the Internet, Ethernet, and/or phone systems) to a desktop augmented dashboard display which enables organization agents to receive feedback and suggestions in real time for guiding customer interactions. Said augmented dashboard preferably connects with the semantics engine and the customer data collected across all available channels. The augmented dashboard also preferably enables the agent to perform semantic annotation of a current interaction as they are performing agent work in real time including typing text for websites, typing text for online chat, or speaking over the phone. Further annotations may also be applied offline such as for building responsive websites. Said interaction is preferably stored with the said semantic annotation provided by the agent and stored with the IM system semantics database.

The invention is a preferably composed of a method and a computer system that enable: (1) annotating, storing, and searching a customer interaction; (2) using said annotations to evaluate an interaction strategy; (3) enable rapid design of new interaction strategies; (4) semantics-based monitoring of agent work and customer behavior; (5) development of adaptive interaction strategies based on customer information state and goals; and (6) quantitative validation of customer segments through information and goals processing. Through a computer system connected through the network to the IM system, a business-user can analyze the strategies being used and recommended through the IM system and visualize their relationship to outcomes.

In some embodiments, The business user may write a description of a strategy that is included within the IM system database and describes the strategy to be implemented. The business user may also write descriptions of sample interactions. In said embodiments, the IM system preferably includes a strategy experiments manager (SEM), which allows the business user to design experiments based on the strategy and to perform analytics. The annotation engine available through the augmented dashboard informs an agent which strategy they are to use and also enables the agent to report how closely they followed the strategy and what elements of the strategy were used to guide their interaction. In some embodiments the semantics engine preferably uses these to learn strategy semantics and enable the business user to search by strategy and to see how the strategy impacted agent work. The business user can use that feedback to further refine the strategy, and in some embodiments an automated strategy engine implemented in a computer system can generate descriptions of new strategies and augment descriptions of existing strategies.

The present invention preferably performs the annotation using terms in a stored lexicon and stores relationships between terms in the lexicon using concepts which are also contained in the lexicon. Preferred embodiments use co-occurrence statistics and machine learning methods to infer relationships between terms detected. Term discovery and clustering is performed using the annotation interface available to the user as well as through automated parsing with natural language processing algorithms. Terms may be associated with any segment of an interaction where they will often correspond to words and phrases for text interactions such as the text typed into a web chat window, the text typed by a user into a form on a website, or the words spoken by the user over a voice messaging system.

DETAILED DESCRIPTION OF THE PRESENTLY PREFERRED EXEMPLARY EMBODIMENTS

A "device" in this specification may include, but is not limited to, one or more of, or any combination of processing device(s) such as, a cell phone, a Personal Digital Assistant, a smart watch or other body-borne device (e.g., glasses, pendants, rings, etc.), a personal computer, a laptop, a pad, a cloud-access device, and/or any device capable of sending/receiving messages to/from a local area network or a wide area network (e.g., the Internet), such as devices embedded in cars, trucks, aircraft, household appliances (refrigerators, stoves, thermostats, lights, electrical control circuits, the Internet of Things, etc.).

An "engine" is preferably a program that performs a core or essential function for other programs. An engine can be a central or focal program in an operating system, subsystem, or application program that coordinates the overall operation of other programs. It is also used to describe a special-purpose program containing an algorithm that can sometimes be changed. The best known usage is the term search engine which uses an algorithm to search an index of topics given a search argument. An engine is preferably designed so that its approach to searching an index, for example, can be changed to reflect new rules for finding and prioritizing matches in the index. In artificial intelligence, for another example, the program that uses rules of logic to derive output from a knowledge base is called an inference engine.

As used herein, a "server" may comprise one or more processors, one or more Random Access Memories (RAM), one or more Read Only Memories (ROM), one or more user interfaces, such as display(s), keyboard(s), mouse/mice, etc. A server is preferably apparatus that provides functionality for other computer programs or devices, called "clients." This architecture is called the client-server model, and a single overall computation is typically distributed across multiple processes or devices. Servers can provide various functionalities, often called "services", such as sharing data or resources among multiple clients, or performing computation for a client. A single server can serve multiple clients, and a single client can use multiple servers. A client process may run on the same device or may connect over a network to a server on a different device. Typical servers are database servers, file servers, mail servers, print servers, web servers, game servers, application servers, and chat servers. The servers discussed in this specification may include one or more of the above, sharing functionality as appropriate. Client-server systems are most frequently implemented by (and often identified with) the request-response model: a client sends a request to the server, which performs some action and sends a response back to the client, typically with a result or acknowledgement. Designating a computer as "server-class hardware" implies that it is specialized for running servers on it. This often implies that it is more powerful and reliable than standard personal computers, but alternatively, large computing clusters may be composed of many relatively simple, replaceable server components.

The servers and devices in this specification typically use the one or more processors to run one or more stored "computer programs" and/or non-transitory "computer-readable media" to cause the device and/or server(s) to perform the functions recited herein. The media may include Compact Discs, DVDs, ROM, RAM, solid-state memory, or any other storage device capable of storing the one or more computer programs.

Figure 1:
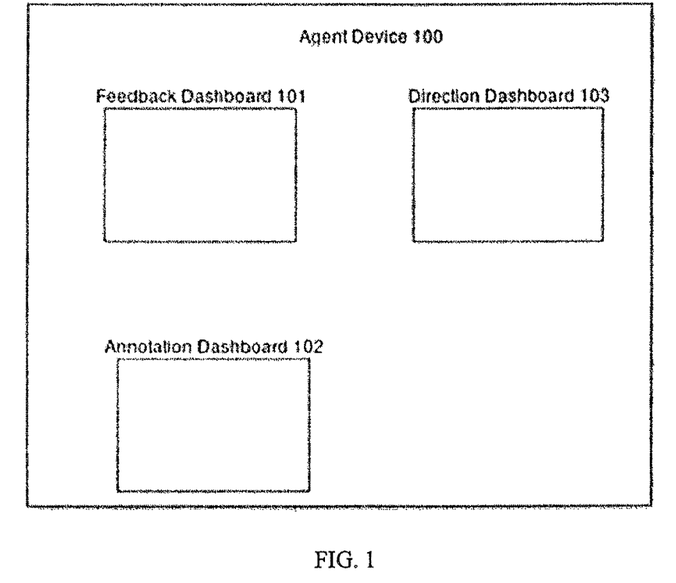
FIG. 1 is a schematic block diagram illustrating an embodiment of agent device in the present invention.

In overview, the present invention provides an "agent interaction application" which is preferably implemented in desktop application, web application, mobile application, embedded hardware application, and/or other portal, to connect to a "customer interaction server" when an agent performs "interaction agent work", which is agent work where the agent directly interacts with a customer. The agent interaction application is preferably implemented on an agent device 100 in FIG. 1. The interaction agent application features an augmented dashboard display that preferably includes: (i) a feedback dashboard 101 which contains dynamic feedback generated for the agent, (ii) an annotation dashboard 102 that enables the agent to provide annotations of the interaction, and (iii) a direction dashboard 103 provides instruction to the agent about the tactics and strategies to employ within the current system. In some embodiments, these dashboards may be visible simultaneously, be location configurable, and/or support resizing/temporary hiding to reduce the visual clutter for the agent when working with the dashboard.

Figure 2:
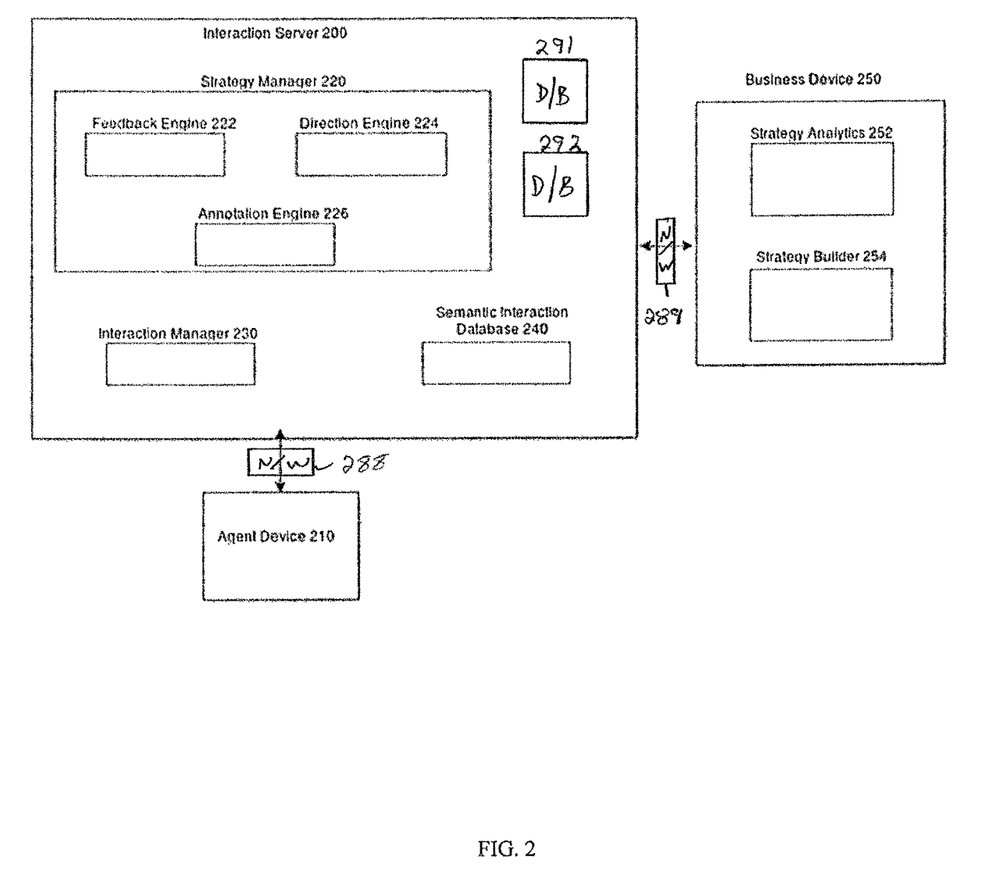
FIG. 2 is a schematic block diagram illustrating an embodiment of the interaction server in the present invention.

In some embodiments of the present invention, the user device is also connected to the medium of interaction such as in the case of web chat, web site editing, and/or voice conversation. In these cases, data collected from the medium of interaction is preferably routed through the interaction manager 230 (FIG. 2), shared with the interaction server 200, and then passed to the agent device 210 in a processed form to display in the agent dashboard. The organization of different units is shown in FIG. 2. The communications described in FIG. 2 may take place through networks 288 and/or 289. Preferably, these networks are the Internet. The agent device 210 is preferably connected to the interaction server 200 through the network 288, and the interaction server 200 simultaneously manages several agent devices 210 for different, plural agents. The interaction server 200 preferably has (i) a strategy manager 220 that organizes the information to be displayed to the agent on the agent device 210, (ii) an interaction manager 230 to collect and organize the information being received from the agent device 210, and (iii) a semantic interaction database (one or more memories) 240 for storing the information collected from the interactions with semantic annotations. The interaction manager 230 is also connected to other devices that serve as the medium of interaction so that interaction records may be stored in the database 240. The interaction manager also is preferably connected to other databases 291, 292 storing customer records so that contextual information about the customer can be made available to the strategy manager and better direction is provided to the agent through the dashboards on the agent device 210.

The semantics interaction database 240 preferably contains a lexicon which has a set of terms that describe a semantic space known to the present invention. Terms are associated with entities and concepts which are stored as relationships between entities. In some embodiments the semantics interaction database 240 comprises a hypergraph database to enable many entities to share a relationship. Each relationship is itself stored in the database. Each entity has meta-data to assist in understanding the entity which includes: words/phrases that refer to the entity, links to interactions where the entity is mentioned, description of the entity in natural language, picture of the entity, etc. Relationship concepts also have words/phrases that identify them and they should be stored with links to locations where they occur. The hypergraph edges storing a specific relationship being associated with a set of entities is called a "relationship instance" and also includes metadata such as a confidence level in the relationship instance.

New entities and relationships preferably can augment the database either through a manual process (through annotation) and/or by automatic discovery (using machine learning algorithms provided over interaction records or other data available to the organization). Common approaches include using co-occurrence statistics of particular entities and words potentially related to relationships. Some of the entities stored have entity-specific information: e.g. each customer is an entity and customers also have a purchase history which may be stored as a time series that is associated with a particular user. "Interaction segments" are all the events measured regarding an interaction that fall within a time interval having well-defined start and end times are also stored in the semantic interaction database 240 and will be associated with specific customers, specific agents, and other entities that are referred to within the interaction. Some entities stored in the semantic interaction database 240 will preferably include the items that are for sale and general entities that may be discussed in conversation, such as through web chat or on the organization web site. Other entities can be abstract concepts corresponding to discourse semantics such as the presence of a question, request, statement, etc. within a web chat with the agent. These entities will generally be manually entered through an annotation system.

In some embodiments, a business user may also design strategies, organize which agents are using which strategies, and perform diagnostics over the strategies being employed by agents. The business user in these cases preferably uses the business device 250 which preferably has (i) an analytics display 252 for summary data of the strategies being used and (ii) a strategy builder 254 where the business user can construct new strategies and organize their deployment among the agents. The strategy information is shared through the network 289 with the interaction server where the strategy information is used by the strategy manager to inform the feedback engine 222, direction engine 224, and annotation engine 226. The strategy builder 254 tool allows the business user to enter a description of the strategy. In some embodiments, the strategy description is augmented with a semi-automated process to enable richer instructions to the strategy manager. The description of the strategy is preferably parsed into terms and relationships offering the business user an annotation menu to assist the automatic process. The terms and relationships are preferably used to search the semantic interaction database 240 for segments of interactions that match the description, and the business user can determine whether the segments match the strategy being suggested and suggest changes in the agent messages that more closely mirror the desired strategy. These annotations are then preferably stored along with the strategy inside the semantic interaction database 240 and are provided to the strategy manager. In some embodiments, the business user may review previous interactions and judge whether those interactions correctly followed the strategy and provide feedback on that basis. The strategy information may be augmented by the business user with optimal responses that may be accessed through a menu on an agent medium of interaction such as particular phrases or messages that are available on a web chat or other natural language generation tools for editing websites.

In various embodiments, the strategy analytics module 252 of the business device 250 uses customer outcome data available through the semantic interaction database 240 to compare the outcomes to the interactions and the strategies employed in those interactions. The strategy builder module 344, in various embodiments, will support the design of experimental work so that a causal inference can be applied to the effectiveness of various strategies, which may then be displayed within the strategy analytics module 342.

The direction engine 300 (FIG. #) preferably uses the strategy or strategies (as determined by the strategy manager 220) to be used in a given interaction to determine the tactics and actions that the agent should use in an interaction and provide the information for a display on the direction dashboard 103. The direction provided in the direction dashboard 310 in FIG. 3 (belonging to the agent device, not shown in FIG. 3) is preferably displayed through instructions for actions to take in the action direction module 311, which (i) for web chat, will preferably include suggested responses, (ii) for websites will preferably include suggested text to save, and (iii) for floor sales may include locations to direct the customer, etc. There is also a tactic direction module 312 where the system provides high-level information to the agent about structuring the interaction properly such as suggestions about language to use when talking with the specific customer based on an analysis of the customer segment (using information from the semantic interactions database), information about the length of messages to send in a web chat, themes of stories to tell, topics of questions to ask, etc. The tactic information is preferably related to the high-level strategy but is preferably tied to a particular time within the interaction rather than a strategy which is a high-level description of how to conduct an entire interaction.

Figure 3:
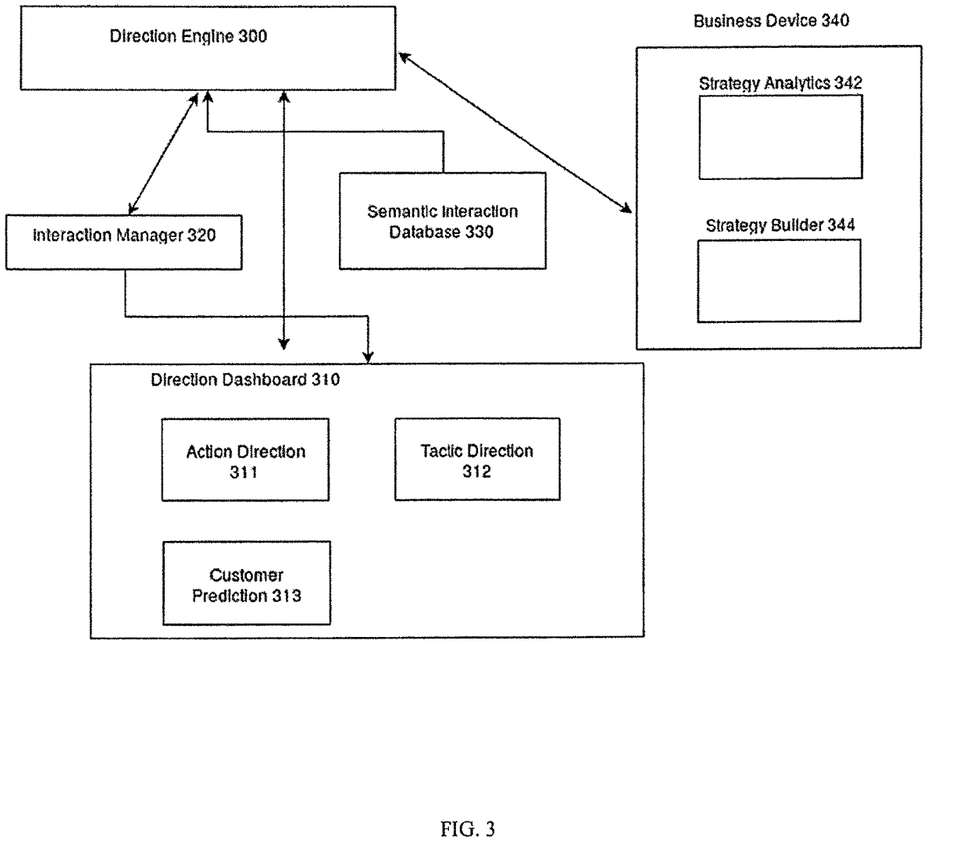
FIG. 3 is a schematic block diagram illustrating an embodiment of the direction engine in the present invention.

The direction dashboard 310 preferably contains a customer prediction module 313 which provides specific predictions about customer behavior during the interaction and what the customer will do, such as the likelihood of a sale at one or more particular points in a web chat conversation, and also potential issues that the customer might bring up. The customer prediction module 313 provides the agent with a means to understand the likely context in which they will deploy the tactics and actions suggested by the tactic direction module 312 and the action direction module 311, respectively. The direction module preferably uses the semantic interaction database 330 in order to generate the descriptions of agent work suggested by the action direction module 311. These modules may have automated responses set through the business user in the business device 340 through the strategy builder 344, or they may be generated automatically using machine learning algorithms over data stored in the semantic interaction database 330.

In the case of pre-set stored instructions, the data is preferably stored in the semantic information database 330 and will be marked as related to particular strategies so that the strategy engine can find the relevant instructions within the database. These modules may be visible simultaneously on the direction dashboard, or only some subset will be visible. The agent or other user preferably will be able to determine the precise layout of the dashboard and, in some embodiments, it may be configurable to optimize the presentation of information. In some embodiments, a reinforcement learning machine learning algorithm (available in the direction engine 300) will use the agent-identifier coupled with the interaction state to make a prediction on the optimal layout of information for the agent, based on the product of key outcomes, as measured through customer behavior.

The agent device 210 in the present invention also preferably includes an annotation dashboard 410 (FIG. 4) that provides feedback to the agent in real-time, as they are conducting the interaction. At given, predetermined (e.g., periodic and/or fluid) feedback points during the interaction (as scheduled by the interaction manager 420), the interaction manager 420 preferably uses the interaction history up until that feedback point and informs the strategy manager 400 of that current state. The interaction is compared with the strategy or strategies being implemented by the strategy manager 400, as well as compared against several predetermined standards (preferably using natural language processing by the feedback engine 401) to generate text feedback and analytical feedback on the current performance of the agent within the interaction. The feedback is preferably presented in the feedback dashboard 410 through: (i) the action feedback module 411 which preferably displays feedback on specific actions taken, such as a general score for the action quality, examples of good actions, examples of bad actions, etc.; and (ii) the tactic feedback module 412 which preferably provides scores for how closely the interaction mirrors the tactics suggested by the tactic direction module 312 earlier in the interaction. These modules may be visible simultaneously on the direction dashboard 310, or only some subset(s) may be visible. Thus, the agent or other user will be able to determine the precise layout of the dashboard, and in some embodiments it may be configurable to optimize the presentation of information. In some embodiments, a reinforcement learning machine learning algorithm (available in the feedback engine 401) will use the agent-identifier coupled with the interaction state to make a prediction on the optimal layout of information for the agent, based on the product of key outcomes as measured through customer behavior.

Figure 5:
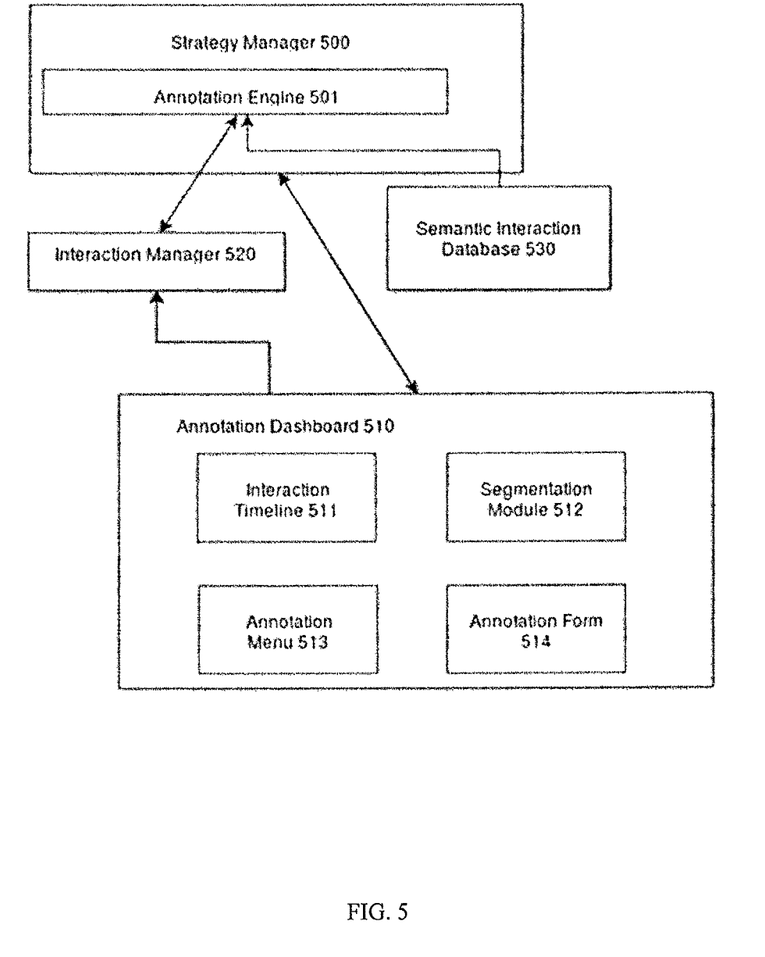
FIG. 5 is a schematic block diagram illustrating an embodiment of the annotation engine in the present invention.

The agent device 100 in the present invention preferably includes an annotation dashboard 510 (as shown in FIG. 5) which displays tools for the agent to annotate the interaction with semantic information and other meta-data in the semantic interaction database 530. The annotations are preferably constructed in a semi-automated process that includes automatic annotation with human input. At several predetermined time points preferably scheduled by the interaction manager 520 during an interaction, the interaction manager sends information about the interaction to the strategy manager and it is processed by the annotation engine: e.g. for web chat, each message sent through the web chat instant messaging system will be passed to the annotation engine 501. The annotation engine preferably performs several fully automatic annotations which may be ranked and given a predetermined confidence factor. These annotations are preferably performed by associating (i) a term, a relationship, a term with a relationship, several terms with several relations drawn from the semantics interaction database 530 with (ii) a "segment" of the interaction where a segment preferably corresponds to the interaction events falling within periodic time intervals having a well-defined start times and end times; although the segments may be based on events rather than time.

The automated segmentations are preferably made visible in the segmentation module 512, in the annotation dashboard 510, to present the agent with automated segmentations as well as several actions to either accept a given segmentation or to suggest new segmentations. New segmentations can be provided by selecting segments from an interaction summary that concisely presents the information from the interaction in a time-line form. The boundaries of a segmentation can also be modified within the segmentation module. These segmentations will preferably have an available menu of term-based annotations which may use a term, a relationship, a term with a relationship, several terms with several relationships stored in the semantics interaction database that are associated that can be selected from in the annotation menu 513.

There is preferably an annotation form 514 that allows the agent to augment the database with new term-based annotations and potentially new terms to provide novel annotations. The annotation menu 513 may also present the user with a sequence of decisions to narrow the set of possible segmentations. The annotation form 514 may also present a natural language interface to give the segmentation engine hints as to how to segment the interaction. These modules may be visible simultaneously on the direction dashboard, or only some subset may be visible. The agent or other user will thus be able to determine the precise layout of the dashboard, and in some embodiments, it may be configurable to optimize the presentation of information. In some embodiments, a reinforcement learning machine learning algorithm (available in the annotation engine 501) will preferably use the agent-identifier coupled with the interaction state to make a prediction on the optimal layout of information for the agent, based on the product of key outcomes as measured through customer behavior.

Figure 4:
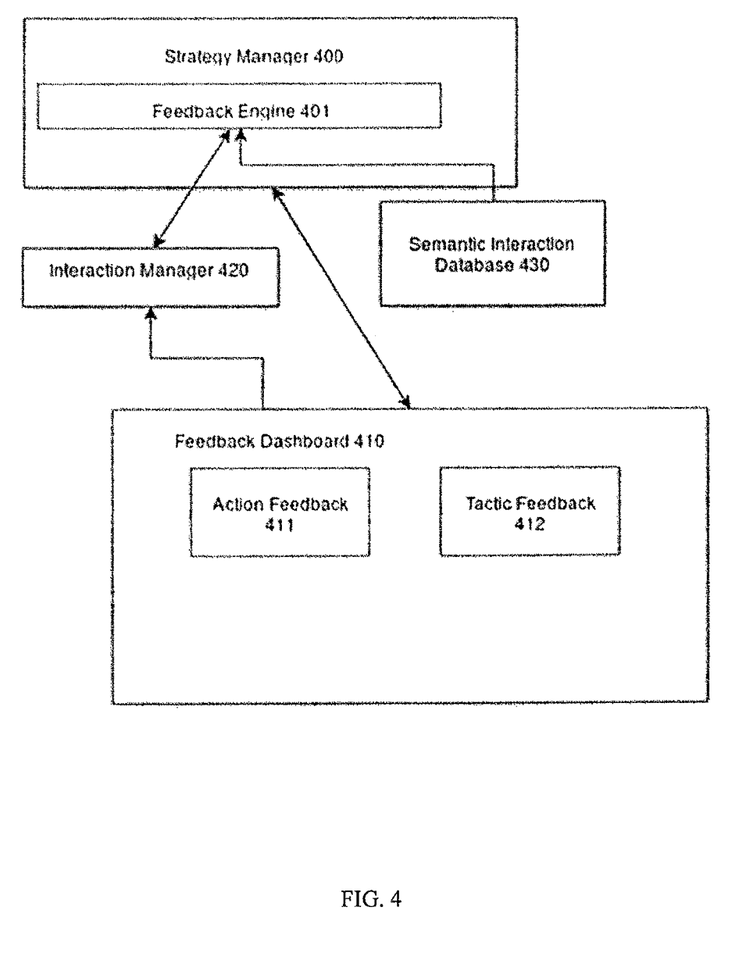
FIG. 4 is a schematic block diagram illustrating an embodiment of the feedback engine in the present invention.

In preferred embodiments of the present invention, the annotation dashboard 510 also enables annotation of the feedback dashboard 410 outputs at various points in the interaction, and the direction of dashboard 310 outputs at various points in the interaction. The annotation dashboard 510 is preferably be accessible after the interaction has finished and can be used to provide feedback to the automated outputs in the other dashboards. These annotations are preferably sent through the network, to be stored in the semantic interaction database 530, to provide further information to better train the direction engine 300 and the feedback engine 401. In various embodiments of the present invention, after certain quantities of annotations have been performed (the quantity level(s) to be set by a business user) the direction engine 300 and the feedback engine 401 are retrained on the annotated data to produce better outcomes based on the annotations, interaction data, and interaction outcomes.

The present invention is disclosed herein in terms of preferred embodiments thereof, which provide apparatus and method for customer interaction semantic annotation and analytics, as defined in the appended claims. Various changes, modifications, and alterations in the teachings of the present invention may be contemplated by those skilled in the art without departing from the intended spirit and scope of the appended claims. It is intended that the present invention encompass such changes and modifications.

What is claimed is:

1. A computer-implemented method of directing agents to optimize customer experiences, the method comprising:
    under control of an agent device, display to the agent on an agent device display information corresponding to:
        (i) a plurality of instructions for implementing a customer interaction strategy using a suggestion engine;
        (ii) a plurality of feedback for the agent dependent on the interaction history, interaction context, using a machine learning based feedback engine; (iii) a plurality of annotation actions determined by the interaction history, interaction state, a customer identifier associated with the customer, an agent identifier associated with the agent;
    in response to an agent selection-annotation-action performed on the agent device, an annotation system server using an annotation engine to add an annotation to an annotation database accessed through a network as a part of the annotation system;
    using an interaction manager that gathers interaction data from measurements of the agent interaction with customers in real-time including the provided annotations and tracks a current state of the interaction including the interaction history, interaction context, and interaction outcomes and stores the interaction data in a semantic interaction database; said interaction outcomes including customer behavior and agent behavior;
    using a strategy manager that determines the current strategy for the agent to implement using the interaction history, the agent identifier associated with the agent, the visitor-identifier associated with the visitor, and descriptions of strategies available to the strategy manager;
    using a machine learning based direction engine that generates a dynamic or static display in the agent device for providing text, diagrams, sound and/or images to the agent for assisting the agent to identify opportunities to deploy specific interaction tactics associated with the current strategy and suggesting specific agent actions associated with said specific interaction tactics using the information provided by the interaction manager on the interaction state;
    using the machine learning based feedback engine that tracks the interaction strategy from the strategy manager, the interaction tactics, and agent actions generated by the direction engine; and compares the interaction strategy, interaction tactics, and agent actions to the interaction history and interaction context to provide feedback to the agent on which interaction strategies, interaction tactics, and agent actions have been taken, whether they are producing outcomes useful to the organization, and how they relate to the implementation of the selected strategy;
    using an annotation engine that statically or dynamically constructs a set of annotation actions that are displayed in a first menu on the agent device so that the annotations may be recorded by the agent in real-time during the interaction and have the annotations stored within the semantic interaction database; said annotation actions including a form for indicating segmentation of the interaction into semantically meaningful segments, as well as a lexicon of annotation terms to associate with a given segment; said annotation terms being drawn from entities stored in the semantic annotation database with a subset of prefilled terms selected by the annotation engine as well as a second menu to enter in other terms or new terms;
    said semantic interaction database storing said real-time annotations and other meta-data including (i) the interaction context, (ii) the strategy, tactics, actions suggested by the direction engine, (iii) the feedback provided by the annotations; a search mechanism provided with the database for accessing semantically similar interactions using a semantic distance measure, finding all annotations of a given interaction, organizing concepts related to the semantic annotations and the interactions into a lexicon, and storing relationships between the concepts and interactions contained therein; said lexicon comprising of the concepts in the database, the terms for performing the annotation;

using an entity engine for refining the lexicon and constructing new entities; said refinement and construction performed when the agent enters new terms into the annotation engine; said lexicon including a probabilistic mapping of words and phrases and contexts to terms in the lexicon enabling automatic annotation;

retraining the direction engine and the feedback engine after a predetermined number of annotations have been recorded.

2. The method of claim 1 further comprising:

using a strategy manager interface for a business user of the strategy manager available to the business user through a business user device; said strategy manager interface connecting through the network to the interaction database and the semantic database to provide the business user displays, examples, and statistics from the databases about the strategies that are being deployed and their effectiveness by combing outcome information from the semantic interaction database with the strategy, tactics, and actions suggested by the direction manager during the chat;

identifying the semantically meaningful customer segments automatically using the semantic interaction database;

said strategy manager providing an interface for the business user to construct a strategy implemented using a natural language description available to agents through the agent device; said construction of the strategy also automatically generating directions for tactics and actions using the semantic database.

3. The method of claim 1, wherein the interaction comprises web chat and the interaction data comprises a text dialogue between a customer and an agent.

4. The method of claim 1, wherein the interaction comprises voice on a telephone or voice through the network where the interaction data is audio recordings.

5. The method of claim 1, wherein the entity engine semi-automatically derives and augments the semantic interaction database with new entities; said derivation performed using interaction data, agent annotations, and alternative data sources such as a webpage or internal documentation;

said derivation including an automatic portion for determining candidate new terms from words or phrases used in the interaction data or referred to by alternative data sources by comparing words or phrases to those already contained in the system;

the annotation engine also including a manual interface for the agent to manually identify candidate entities related to an interaction segment and to suggest new entities to discover;

said lexicon also including relationship concepts connecting entities; said derivation process also containing clustering algorithms to identify common co-occurring entities to allow automatic addition of new relationships to the lexicon.

6. The method of claim 1, implemented on text interaction data including an automated annotation module that automatically segments interaction data and connects the smallest segments to terms in the semantic interaction database using a probabilistic mapping between words, phrases, and contexts; said automatic annotations performed using information contained across multiple interaction data segments containing related entities and concepts over multiple channels.

7. The method of claim 1, wherein the annotation interface is available after the interaction has concluded and the agent or another agent may access the interaction data through the semantic interaction database and contribute more annotations to the semantic interaction database.

8. The method of claim 6, wherein the interaction is an in-person discussion between the agent and the customer where the interaction data may include notes produced by the agent after the sale.

9. The method of claim 6, wherein the interaction is a customer visiting an organization web site and the interaction data is the customer actions on the web site and the browser behavior on the customer device as directed by the web site; the annotation engine allows addition of further content to the website.

* * * * *